Feb. 23, 1932. J. C. EATON ET AL 1,846,027
MIXER
Filed Oct. 10, 1930 2 Sheets-Sheet 1
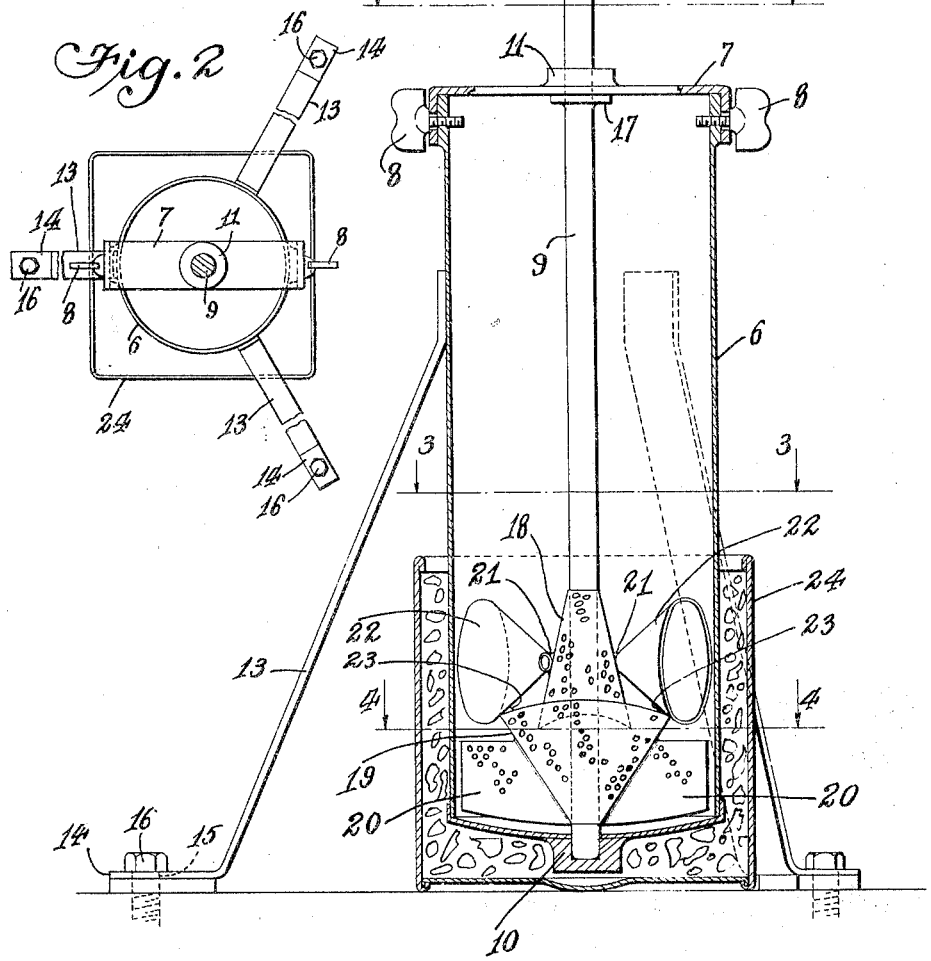

Feb. 23, 1932. J. C. EATON ET AL 1,846,027

MIXER

Filed Oct. 10, 1930 2 Sheets-Sheet 2

Joseph C. Eaton
Laurence W. Dickey
Edward Field Inventors

By Lyon & Lyon Attorneys

Patented Feb. 23, 1932

1,846,027

UNITED STATES PATENT OFFICE

JOSEPH C. EATON, OF RICHMOND, AND LAURENCE W. DICKEY AND EDWARD FIELD, OF BERKELEY, CALIFORNIA, ASSIGNORS TO STANDARD OIL COMPANY OF CALIFORNIA, OF SAN FRANCISCO, CALIFORNIA, A CORPORATION OF DELAWARE

MIXER

Application filed October 10, 1930. Serial No. 487,716.

This invention relates to beaters or mechanical stirring devices whereby ordinarily immiscible liquids or a combination of liquids and solids are intimately mechanically mixed so that the viscosity of the resultant product is comparatively high and the emulsion is stable. The invention may be used, for example, in the preparations employing emulsions of an edible oil such as mayonnaise which is best produced by not simultaneously agitating the ingredients but by performing the operations in a certain sequence.

At the present time, for mixing and/or emulsifying substances, there are a number of devices employing paddles, impellers, baffles or the like members and these devices have certain disadvantages.

For example, it has been found that the inclusion of air bubbles, drawn into the agitated mass by the vortex produced by certain types of mixers, has a tendency to make the resulting emulsion unstable, since the air bubbles will, in time break.

Other types, that use impellers and stationary baffle plates with small clearances and high velocities and turbulance are not suited for processes requiring the addition of the various components of the mixture in a certain sequence, since the arrangement of the impellers and stationary baffle plates is such that the agitated mixture is not returned to the impellers for further treatment after leaving the zone in which said impellers operate.

It is an important object of the present invention to cheaply emulsify various emulsifiable mixtures such, for example, as produce mayonnaise, without the difficulties now experienced with the devices at present employed for producing such products.

Another important object is to produce a maximum dispersing effect on the ingredients of the product being produced.

Another important object is to provide a construction which utilizes the action of moving scoops or bowls to return the partly emulsified mixture to a point where it will again be subjected to a violent stirring or beating to further promote emulsification.

Other objects and advantages will appear in the subjoined detailed description.

The accompanying drawings illustrate the invention.

Figure 1 is substantially a vertical section of a mixer constructed in accordance with the provisions in this invention.

Figure 2 is a reduced plan view, partly in section, viewed from the line indicated by 2—2 Figure 1.

Figure 3:
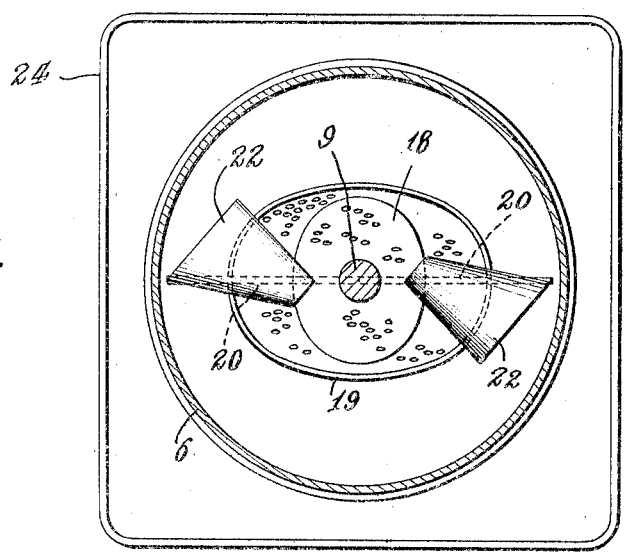
Figure 3 is an enlarged plan view, partly in section, viewed from the line indicated by 3—3 Figure 1.
Figure 4:
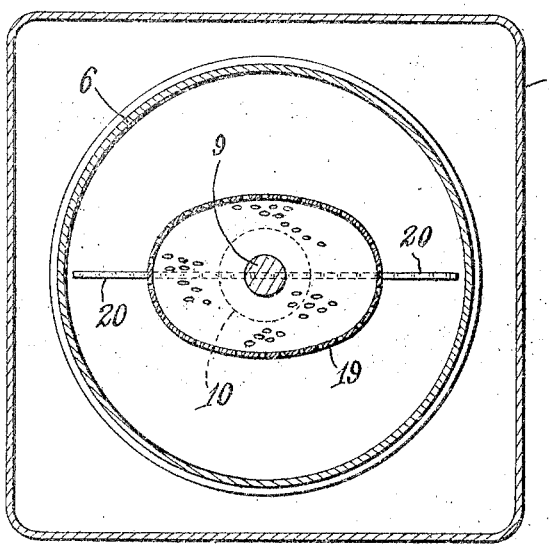
Figure 4 is a horizontal section on the line indicated by 4—4 Figure 1, omitting the base and braces.

Referring to the drawings, there is provided a receptacle 6 in which the substance or substances to be beaten, mixed and/or emulsified are placed. The receptacle 6 is provided with a removable yoke 7 held in place by thumb screws 8.

The rotary elements of the mixer are operated by a vertical shaft 9 which is located at the vertical axis of the receptacle 6. The lower end of the shaft 9 turns in a step bearing 10 and the upper end of said shaft projects above the yoke 7 which is provided with a bearing 11 for said shaft.

The shaft 9 is driven by any suitable means and, in this instance, is provided with a pulley 12 that may be connected by a belt to a motor.

The receptacle 6 may be constructed, for example, of suitable material such as tinned copper. In order to steady the receptacle 6 and to hold said receptacle a little above the surface supporting it, for a reason that will appear hereinafter, the receptacle is provided with a number of braces or legs 13 which are suitably attached at their upper ends to the upper portion of the receptacle 6 and which are provided in their lower outwardly bent portions 14 with holes 15 for the reception of holding down bolts 16.

The shaft 9 is provided with a collar 17 which engages the lower face of the yoke 7 to prevent upward motion of shaft 9, thereby maintaining the lower end of the shaft in the step bearing.

Mounted on the lower portion of the shaft 9 are a number of perforate hollow cones or members 18, 19. The members 18, 19 are cone-shaped, the larger end of the upper member 18 being directed downwardly and the larger end of the lower member 19 being directed upwardly. In this instance, the member 18 projects slightly into the member 19. The mouth of the cone 19 is larger than the mouth of the cone 18. In the preferred form of the apparatus, it has been found desirable to construct the conical members 18, 19 elliptical in cross section to obtain a beating effect on the contents of the mixer.

Vanes 20, which are preferably perforate, are designed to be rotated by the shaft 9 and in this instance said vanes 20 are secured at their inner ends to the outer face of the cone 19 so that the vanes and the cone 19 have the same plane of rotation. The clearance between the outer ends of the vanes 20 and the inner face of the receptacle 6 is comparatively small.

Attached to the outer face of the cone 18, as indicated at 21, are truncated elliptical conical scoops 22 the larger ends of which are turned outwardly. The inner smaller ends of the scoops 22 constitute the outlets of said scoops and they are spaced slightly from the outer face of the cone 18 so that any substances flowing into the scoops through their mouths will be discharged against the cone 18.

The scoops 22 may also be secured at 23 to the cone 19. The scoops 22 are not arranged radially of the shaft 9 but their larger open ends or mouths partially face the direction of rotation of the shaft which, in this instance, turns clockwise in Figure 3. The scoops preferably are positioned so that their longitudinal axes extend at an angle of approximately 60° to the surface of the cone 18.

It has been found advantageous, in some instances, to employ a second receptacle 24 of larger diameter than the receptacle 6 so as to partly enclose said receptacle 6. In the receptacle 24 is placed a cooling medium as, for example, a mixture of ice and salt, for lowering the temperature of the substance or substances being beaten, and for maintaining the substances at the lower temperature regardless of the heat generated by friction in the mixing process.

The foregoing will make clear the construction and operation of the invention. However, a specific example of the operation of the invention in the preparation of a quantity of mayonnaise for medicinal purposes, using an edible mineral oil, is as follows:

The ingredients employed are 1 egg.

1½ pints (710 c. c.) edible mineral oil, (viscosity 170 Saybolt seconds at 100 degrees F.).

40 c. c. white vinegar.

30 grams spices (salt, mustard, paprika, white pepper and sugar).

The above ingredients should be mixed at a temperature of about 50 degrees F. and to accomplish this, a mixture of ice and salt is placed in the receptacle 24 and the driving mechanism is then started into operation. Preferably, the shaft 9 will be driven at about 1600 R. P. M. in a clockwise direction.

The egg, previously beated in any suitable manner, is transferred to the receptacle 6 and there agitated for three or four minutes or until it is fairly thick. The edible mineral oil is then added, a drop or so at a time, until the emulsion further thickens and the oil is then added more rapidly until about 100 c. c. have been added.

The vinegar is next introduced to the receptacle 6, preferably by means of a separatory funnel, at the rate of about one drop per second.

Then the spice is added in small quantities together with more oil. After about 500 c. c. of oil has been put in, the motor is stopped and the mass in the receptacle 6 is disturbed with a glass rod, holes being made in the emulsion by the rod to allow more oil, which is now introduced, to gravitate to the bottom of the receptacle 6.

The motor is again started into operation so that the latter addition of oil will be churned up and then the procedure described above, of stopping, disturbing the mixture, adding oil and starting the motor, is repeated. It should be possible to add in this operation the remainder of the oil, vinegar and spices. Then the motor is again started into operation so as to finally agitate the mass for complete mixing, whereupon the emulsion may be taken from the receptacle and bottled or otherwise disposed of.

It will be seen that the substance or substances placed in the receptacle 6 will be forcibly engaged by the revolving vanes 20 and that the substances will be forced at a relatively high velocity through the perforations in said vanes, thus thoroughly churning the liquid so as to considerably thicken the substances. As the oil is dropped into the receptacle 6, the oil particles are caused to pass through the perforations of the vanes, thus dispersing the oil particles within the particles of the thickened egg, causing the mass to become more and more emulsified as the oil is added.

As the volume of the emulsified mass increases its upper surface or level approaches the zone in which the perforate cones operate and, finally, to the zone in which operate the scoops which, because of their tangentially inclined positions, receive the upper portion of the emulsified material and forcibly discharge said material back into the remainder of the material where it ultimately comes again into contact with the vanes, thus causing a complete and thorough mixing as well as complete and thorough dispersion of the different kinds of liquid particles so as to form a stiff emulsion.

We claim:

1. A mixer including rotatably mounted opposed perforate elliptical hollow cones, perforate vanes attached to one of said cones, and impeller scoops discharging toward the cones.

2. A mixer including a receptacle provided with bearings, a shaft mounted to turn in said bearings, a pair of opposed perforate cones of elliptical cross section carried by and surrounding the shaft within the lower portion of the receptacle, and perforate vanes attached to one of said cones.

3. A mixing device including a receptacle, a shaft rotatably mounted in said receptacle and provided with hollow perforate cones having their larger ends turned toward each other, the upper cone projecting into the lower cone, vanes secured to the lower cone, and scoops secured to the upper cone and having their mouths partially facing the direction of rotation of the shaft, said scoops having discharge openings directed toward the upper cone.

4. A mixer including a receptacle, a shaft rotatably mounted in said receptacle, a pair of opposed perforate hollow cones of elliptical cross section carried by and surrounding the shaft, vanes connected with one of the cones, and means for producing circulation of the contents of the receptacle toward the center thereof.

5. A mixer including a receptacle, a hollow perforate conical member of elliptical cross section rotatably mounted in the receptacle, and a scoop mounted to rotate with the perforate member and having its mouth partially turned in the direction of its rotation, said scoop provided with a discharge opening directed toward the perforate member.

6. A mixer including a receptacle, a hollow perforate conical member of elliptical cross section rotatably mounted in the receptacle, and a scoop mounted to rotate with the perforate member and having its mouth partially turned in the direction of its rotation, said scoop provided with a discharge opening directed toward the perforate member, and a vane mounted to rotate with the perforate member below the scoop.

7. A mixer including a receptacle, a hollow perforate conical member of elliptical cross section rotatably mounted in the receptacle, and a scoop mounted to rotate with the perforate member and having its mouth partially turned in the direction of its rotation, said scoop provided with a discharge opening directed toward the perforated member, and a perforate vane mounted to rotate with the perforate member below the scoop.

8. A mixer including a receptacle, hollow perforate members rotatably mounted in the receptacle, one of the perforate members having an open end projecting into an open end of the other perforate member, and a scoop mounted to rotate with the perforate members and having its mouth partially turned in the direction of its rotation, said scoop provided with a discharge opening directed toward one of the perforate members.

9. A mixer including a receptacle, hollow perforate members rotatably mounted in the receptacle, one of the perforate members having an open end projecting into an open end of the other perforate member, and a scoop mounted to rotate with the perforate members and having its mouth partially turned in the direction of its rotation, said scoop provided with a discharge opening directed toward one of the perforate members, and a vane mounted to rotate with the perforate members below the scoop.

10. A mixer including a receptacle, hollow perforate cones rotatably mounted in the receptacle, the larger ends of the cones being open and one of smaller diameter than the other and the cones turned with their larger ends toward each other, and a means operating to direct the outer portion of the contents of the receptacle inwardly toward one of the cones.

11. A mixer including a receptacle, a hollow perforate cone of elliptical cross section rotatably mounted in the receptacle and adapted to beat the contents of said receptacle when said cone is rotated about its axis, and a means operating to direct the outer portion of the contents of the receptacle inwardly toward the cone.

12. In a mixer, the combination of a rotatable shaft provided with conical impeller scoops carried thereby, the axes of said conical scoops being tangentially related to the axis of said shaft, the axes at small ends of said impeller scoops being positioned closer to said shaft than the axes at large ends of said scoops.

13. A mixer including a receptacle, hollow perforate conical members of elliptical cross section rotatably mounted in said receptacle, one of the perforate members having an open end projecting into the open end of the other perforate member, and a scoop mounted to rotate with the perforate members having its mouth partially turned in the direction of its rotation, said scoop being provided with a discharge opening directed toward one of the perforate conical members.

14. A mixer comprising a receptacle, hollow perforate conical members of elliptical cross section rotatably mounted in the receptacle, one of the perforate members having an open end projecting into an open end of another perforate hollow conical member, and means operating to direct the outer portion of the contents of the receptacle inwardly toward one of said perforate conical members.

Signed at Richmond, California this 2nd day of October 1930.

JOSEPH C. EATON.
   LAURENCE W. DICKEY.
   EDWARD FIELD.